United States Patent Office
3,652,608
Patented Mar. 28, 1972

3,652,608
PREPARATION OF UNSATURATED ESTERS
Donald M. Fenton, Anaheim, Calif., assignor to Union Oil Company of California, Los Angeles, Calif.
No Drawing. Filed Sept. 20, 1968, Ser. No. 761,338
Int. Cl. C07c 69/54
U.S. Cl. 260—486 R
8 Claims

ABSTRACT OF THE DISCLOSURE

Hydrocarbon olefins are reacted with alkyl chloroformates in the presence of a Group VIII noble metal catalyst to yield alpha,beta-ethylenically unsaturated carboxylic acid esters and/or beta-chloro-alkanoic esters. The alkyl chloroformates may be prepared from carbon monoxide, chlorine and an alkanol under conventional conditions, thereby providing a process for the preparation of alpha,beta-ethylenically unsaturated carboxylic acid esters from an olefin and an alcohol. The by-product beta-chloro alkanoic acid esters can be pyrolyzed to obtain the complete conversion of the reactants to the more valuable ethylenically unsaturated esters which are useful as monomers for polymerization to desired products. The reaction is typified by the conversion of ethylene to alkyl acrylates and alkyl beta-chloro propionates which is performed at a temperature of about 150° C. and superatmospheric pressures in the presence of a palladium containing catalyst.

DESCRIPTION OF THE INVENTION

The invention relates to the preparation of ethylenically unsaturated carboxylic acid esters and in particular relates to a method for the preparation of such esters using inexpensive and relatively available raw materials including carbon monoxide, chlorine, alcohols and olefins.

The process of this invention comprises the reaction between olefins and aryl or alkyl chloroformates to prepare directly alpha,beta-ethylenically unsaturated carboxylic acid esters and/or beta-chloro alkanoic acid esters. The reaction proceeds as follows:

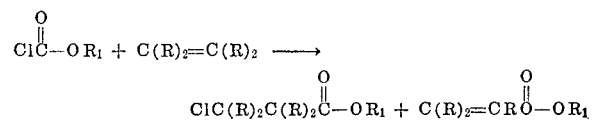

wherein:
the $R_1$ group is alkyl, cycloalkyl or monocyclic aryl;
the R groups are the same or different hydrogen, alkyl or phenyl or wherein two of the R groups on different carbons together form a common alkylene group; and
at least one of the R groups is hydrogen.

The contacting is effected at a temperature from 25° to 350° C. and a pressure from 1 to about 1000 atmospheres in the presence of a Group VIII noble metal containing catalyst, preferably a palladium containing catalyst.

The reaction can be conducted in liquid or vapor phase and heterogeneous catalysis can be employed in either processing, however in liquid phase processing, it is preferred to use a homogeneous catalyst and in vapor phase processing to employ the heterogeneous catalyst. In a preferred embodiment, the reaction is performed in the presence of an acid acceptor, i.e., a basic substance which will react with and thereby adsorb the hydrohalic acid liberated in the reaction. In this manner the optimum pH conditions for the reaction are maintained despite the continuous production of the hydrohalic acid during the conversion.

The choice of the olefin used in the reaction determines the identity of the carboxylic acid in the final ester product. Ethylene is a preferred reactant because of the established market value of the acrylates which are formed by reaction with ethylene. Ethylene also yields beta-chloro propionyl esters and these can be readily pyrolyzed to the more valuable acrylates. Other olefins can be used, however, as indicated in the following paragraphs to illustrate the use of propylene provides a method for the synthesis of methacrylates and crotonates.

Hydrocarbon olefins that can be reacted in accordance with this reaction are branched or a straight-chain unsaturated acyclic or cyclic olefins having one or more double bonds. Olefins having an aryl substituent such as phenyl, tolyl, xylyl, etc., can also be oxidized. Low molecular weight olefins that are gaseous at ambient temperature and pressure such as ethylene, propylene, 1-butene, 2-butene, etc., can be reacted as well as hydrocarbon olefins that are normally liquid at such conditions, such as n-pentene, cyclopentene, 2-ethylhexene, cyclohexene, methylcyclopentene, heptene, 4,4 - dimethylnonene - 1, cyclooctene, octene, cyclononene, 1-nonene, iso-decylene, cycloundecene, dodecene, 1-tetradecene, 4-propyldecene-1, heptadecene, 4-hexadecene, isooctadecene, tetracosene, hexacosene, octacosene, tetracosene, etc. Examples of substituted olefins are vinyl aromatics such as styrene, alpha-methylstyrene, p - methylstyrene, p - vinylcumene, alpha-vinylnaphthalene, 1,2 - diphenylethylene, allylbenzene, o-vinyl-p-xylene, divinylbenzene, 1-allyl-4-vinylbenzene, 1,5 - heptadiene, 2,5 - decadiene, etc. Olefins containing from 2 to about 20 carbon atoms can be reacted in the invention with a preferred range of from 2 to about 12 carbons and the most preferred range from 2 to about 6 carbon atoms. Relatively pure olefins can be reacted to simplify the product recovery steps; however, it is also within the scope of the invention to oxidize olefin mixtures such as mixtures of normally gaseous hydrocarbons, normally liquid hydrocarbons or normally gaseous or normally liquid hydrocarbon olefins.

The reactants are contacted in the presence of catalytic amounts of a platinum group metal. The platinum group metal can be of the palladium subgroup, i.e., palladium, rhodium or ruthenium or of a platinum subgroup, i.e., platinum, osmium or iridium. While all of these metals are active for the reaction, palladium is preferred because of its demonstrated greater activity. The platinum group metal can be employed in amounts between about 0.001 and about 5 weight percent of the liquid reaction medium or of the solid supported catalyst; preferably between about 0.04 and about 5.0 weight percent of these components. The platinum group metal can be employed as a finely divided metal, as the oxide, salt or complex with various ligands. The platinum group metal catalyst can be added to the liquid reaction medium when liquid phase reaction conditions are employed or can be distended or impregnated upon a solid carrier hereinafter defined. Examples of suitable platinum group metal containing sources are the oxides, halides, sulfates, nitrates and salts of the lower $C_1$–$C_5$ carboxylates such as palladium oxide. palladium chloride, rhodium oxide, rhodium acetate, ruthenium dioxide, ruthenium bromide, osmium tetraoxide, osmium trifluoride, iridium dioxide, iridium butyrate, iridium nitrate, palladium sulfate, platinum dichloride, platinum propionate, or iridium acetate, etc.

The Group VIII noble metals readily form complexes with various ligands such as the nitroso, halo or biphyllic ligand complexes and any of these can be used as the noble metal catalyst source. Complexes involving ligands with two or more complexing sites spaced in sufficient proximity to form a ring structure with the metal are chelates and any chelate of a Group VIII noble metal and a conventional metal chelating agent can be used. Examples of various chelates of Group VIII noble metals that can be used include the metal complexes with 1,3-diketones such as acetylacetone, propionylacetone, butyrolacetone, nonanoylacetone, benzoylacetone, etc.

Examples of suitable nitroso complexes include tris-triphenylphosphine nitroso rhodium, tris-triphenylarsine nitroso rhodium, tris-triphenylphosphine nitroso iridium, rhodium nitroso bromide, palladium nitroso chloride, etc. Examples of halo complexes include: potassium hexafluororuthenate, sodium hexachloroosmate, lithium hexachloroiridate, chloroplatinic acid, sodium fluoropallate, etc.

Complexes of the Group VIII noble metal and a biphyllic ligand can also be used. The biphyllic ligand is a compound having an element with a pair of electrons capable of forming a coordinate bond with a metal atom and simultaneously having the ability to accept an electron from the metal of the catalyst. In this manner, the ligand imparts stability to the resulting complex of the catalyst. Biphyllic ligands can comprise organic compounds having at least about 3 carbons and containing arsenic, antimony or phosphorus in a trivalent state. Of these, the phosphorus compounds, i.e., the phosphines, are preferred; however, the arsines or stibines can be employed. In general, these biphyllic ligands have the following structure:

$$E(R)_3$$

or the following structure:

$$(R)_2ER'E(R)_2$$

wherein E is a trivalent atom selected from the class consisting of phosphorus, arsenic and antimony; and wherein R is a member of the class consisting of hydrogen, alkyl from 1 to 8 carbon atoms, aryl from 6 to 8 carbons and halo and alkoxy substitution products thereof; and wherein R' is alkylene having from 1 to about 8 carbons.

Examples of suitable biphyllic ligands having the aforementioned structure and useful in my invention to stabilize the catalyst composition are the following:

trimethylphosphine,
triethylarsine,
triisopropylstibine,
diethylchlorophosphine,
ethyldiisopropylstibine,
tricyclohexylphosphine,
triphenylphosphine,
tri(o-tolyl)phosphine,
phenyldiisopropylphosphine,
phenyldiamylphosphine,
diphenylethylphosphine,
tris(diethylaminomethyl)phosphine,
ethylene bis(diphenylphosphine),
hexamethylene bis(diisopropylarsine),
pentamethylene bis(diethylstibine), etc. Of aforementioned, the aryl phosphines are preferred because of their demonstrated greater activity for stabilization of Group VIII noble metal catalysts. The complex of the Group VIII noble metal and biphyllic ligand can be preformed or the components thereof can be added separately to the reaction zone.

The co-reactant in the process is an alkyl or aryl chloroformate having the following structure:

$$\underset{\text{ClC—OR}_1}{\overset{O}{\|}}$$

wherein:

$R_1$ is alkyl, cycloalkyl or monocyclo aryl having from about 1 to about 12 carbons.

The chloro orthoformate is the reaction product of carbon monoxide, chlorine and the corresponding alcohol as shown in the following reactions:

$$CO + Cl_2 \longrightarrow Cl\overset{O}{\underset{\|}{C}}Cl$$

$$Cl\overset{O}{\underset{\|}{C}}Cl + R_1OH \longrightarrow Cl\overset{O}{\underset{\|}{C}}OR_1 + HCl$$

The hydrochloric acid produced by the second step of the reaction can be readily oxidized and converted to the elemental chlorine for further reaction by the convention technique, e.g., the Deacon process, or similar processing.

In the preceding, the alcoholic reactant can constitute any alkyl, cycloalkyl or aryl monohydroxy alcohol having from about 1 to 10 carbons such as methanol, ethanol, propanol, isopropanol, butanol, isobutanol, pentanol, isopentanol, hexanol, heptanol, octanol, nonenal, decanol, etc. Cyclic alcohols such as cyclohexanol, cyclopentanol, 2-ethylcyclohexanol, methylcyclopentanol, cycloheptanol, methylcycloheptanol, cyclobutanol, etc., can also be employed. Aromatic alcohols such as phenol, naphthol, ortho, meta or para creosol, cumenol, xylenol, etc., can also be employed if desired as well as benzyl alcohol and substituted benzyl alcohols such as p-methylbenzyl alcohol, o-ethylbenzyl alcohol, m-isopropylbenzyl alcohol, etc.

The reaction medium should be kept as free as possible from water, as water will cause the hydrolysis of the reacting chloroformate. Accordingly, it is preferred to employ substantially anhydrous conditions, i.e., to perform the reaction under conditions having less than about 5 percent water and, most preferably, less than about 1 percent water.

In the preparation of unsaturated or beta-chloro esters, liquid phase processing can be used with organic solvents that are liquid at the reaction conditions and inert to the reactants and products. Such solvents include for example: various ethers such as methylethyl ether, diethyl ether, diisopropyl ether, ethylene glycol diisoamyl ether, ethyl benzyl ether, diethylene glycol diethyl ether, triethylene glycol diethyl ether, tetraethylene glycol dimethyl ether, etc.

Various esters can also be employed as the solvents such as methyl acetate, ethyl acetate, isopropyl acetate, ethyl propionate, n-butyl formate, sec-butyl acetate, isobutyl acetate, ethyl n-butyrate, n-butyl acetate, isoamyl acetate, n-amyl acetate, glycol diformate, isoamyl n-butyrate, ethyl acetylacetate, diethyl oxalate, glycol diacetate, isoamyl isovalerate, methyl benzoate, ethyl benzoate, methyl salicylate, n-propyl benzoate, n-dibutyl oxalate, etc.

Saturated hydrocarbons can also be used such as pentane, hexane, heptane, octane, decane, dodecane, mineral oils, etc.

The reaction can also be performed in heterogeneous vapor phase catalysis by employing the catalyst neat or supported on a suitable inert support in the reaction zone. Any support or carrier which is a solid and inert to the reaction can be used such as titania, zirconia, alumina, silica, etc., or combination of these materials. Examples include alumina, silica stabilized alumina containing from 1 to 15 percent silica as described in U.S. Pat. 2,437,532, the aluminum silicates, clay, naturally occurring or synthetically prepared zeolites such as chabazite, gnelenite or faujasite, as well as synthetic zeolites. The latter materials are partially dehydrated crystalline compositions of silica and alumina and contain quantities of one or more exchangeable cations such as sodium, potassium, hydrogen, magnesium, calcium, etc. The compositions and their preparation are described in U.S. Pats. 2,882,243 and 2,882,244. These compositions are characterized by crystal pores of relatively uniform pore diameter between about 5 and 14 Angstrom units. Several crystal forms of such molecular sieves are available and suitable for use herein as the carrier for the catalyst, redox agent and cocatalyst components of my invention including the "X," "Y,"

"L" and "J" crystal types. The sieves can be treated prior to deposition of the aforementioned catalytic metals by ion exchanging the monovalent alkali metal cation with a divalent metal. Also the sieves can be "decationized" by ion exchange with an ammonium salt followed by heating to decompose the zeolitic ammonium ion and leave a hydrogen ion. Any of the aforementioned carriers can be impregnated with appropriate aqueous solutions of salts of the Group VIII noble metals, redox metal or nitrogen oxide salts, and the quinone or hydroquinone cocatalyst.

The catalyst particle size can vary over wide limits from about 0.5 inch to about 1 micron average diameter. The particle size selected depends on the type of solid-vapor contacting employed in the reaction zone. A disperse gas phase reaction would employ the very fine particles passing about a 325 mesh screen. Use of a fluidized bed reactor would require use of particles passing a 20 but retained on a 400 mesh screen. Packed bed reactors, which are preferred, would use the larger diameter particles having diameters from 0.05 to 0.5 inch, preferably from about 0.1 to 0.25 inch. The specific surface of the catalyst can also vary widely, from about 10 to 800 square meters per gram.

The noble group metal component of the catalyst when distended on a solid carrier can be employed in an amount from about 0.01 to about 25 weight percent of the final catalyst. Preferably the noble metal is employed in a concentration from about 0.5 to about 10 weight percent based on the final catalyst. The noble metal can be distended on the carrier by impregnation of the carrier with a solution of a salt, complex or chelate of the noble metal. The impregnation can be achieved by evaporating the solvent from the admixture of inert carrier and catalyst solution or by addition of a precipitating agent to form an insoluble salt or hydroxide of the noble metal. The catalyst is thereafter dried and can be used in the reaction.

In a preferred embodiment, the reaction is performed in the presence of a suitable acid acceptor which is an alkali metal or alkaline earth metal salt of an inorganic oxo, polyfunctional acid or an aromatic base such as pyridine or quinoline or halo or $C_1$–$C_5$ substituted derivatives thereof. The alkali metal and alkaline earth metal salts, i.e., sodium, lithium, potassium, cesium, calcium, barium, magnesium, etc., salts of various inorganic oxo acids can be used. Examples of these acids include orthophosphoric, polyphosphoric, i.e., pyrophosphoric, tripolyphosphoric, tetrapolyphosphoric, etc., carbonic, arsenous, arsenic, germanic, telleric, boric, iodic, sulfurous, sulfuric, selendous, selendic, telurous, teluric acids, etc. Examples of specific materials that can be used include trisodium orthophosphate, tetrapotassium pyrophosphate, trilithium orthophosphate, tetrapotassium hydrogen tripolyphosphate, cesium carbonate, potassium bicarbonate, barium carbonate, calcium carbonate, calcium arsenate, sodium arsenite, magnesium germanate, barium telarate, potassium borate, lithium arsenate, sodium iodate, sodium selendate, potassium telarate, etc.

Examples of suitable aromatic bases include pyridine, 4-chloropyridine, 2,5 - dimethylpyridine, 4 - ethylpyridine, 4 - bromopyridine, 3 - fluoropyridine, 3,5 - dibutylpyridine, 4 - isopropylpyridine, quinoline, 4 - amylquinoline, 8 - bromoquinoline, 6 - iodoquinoline, 2,6-dimethylquinoline, 3,7 - propylquinoline, 5 - isoamylquinoline, 5,8 - diethylquinoline, etc.

The aforementioned acid acceptors can be incorporated in the liquid phase reaction zone by the addition of from 5 to about 50 weight percent of the acid acceptor based on the liquid reaction medium. The solids can be incorporated in the reaction medium as slurries and can be added as a finely divided solid with a particle size from about 0.001 to about 0.5 inch average particle diameter to insure a sufficient surface area for adequate contacting with the reaction medium and complete adsorption of the hydrohalic acid liberated during the reaction. In vapor phase processing, the solid can be admixed with the aforementioned supported catalyst in an amount comprising from about 5 to about 50 weight percent of the solid supported catalyst. If desired, however, any of the aforementioned solid salts can be employed as the support for the platinum group metal catalyst and can be used in the manner previously described for preparation of an active catalyst by impregnating or precipitating the platinum group metal catalytic agent upon the solids.

The aromatic bases can be dissolved in the liquid reaction solvent in the aforementioned quantities. The bases can also be impregnated onto the solid supported catalyst in the aforementioned amount by treating the solid with a solution of the base in a volatile solvent followed by evaporation of the solvent.

The reaction can be conducted under relatively mild conditions, e.g., 25° to about 350° C.; preferably 75° to about 275° C. and most preferably from 125° to about 225° C. The pressure used in the reaction can be varied from 1 to about 1000 atmospheres; preferably from 10 to about 500 atmospheres; and most preferably from about 15 to 250 atmospheres. In the reaction pressures from about atmospheric to about 150 atmospheres can be used for the vapor phase processing, the lower pressures being favored to avoid formation of a condensed phase in the reaction zone. In liquid phase processing, the higher pressures can be used as desired to insure maximum solubility of the reactants in the liquid phase reaction medium.

In vapor phase processing, the reactants, i.e., olefin and halogenated formate ester, can be introduced into the reaction zone in vapor phase suitably by admixing the proper proportions of these co-reactants with the aid of an inert diluent gas if desired. Relative ratios of the co-reactants can be from about 1:10 to about 10:1 molar parts of the olefin per part of the formate; preferably stoichiometric ratios are employed from about 2:1 to about 1:2 mol parts of the olefin per molar part of the formate ester. If desired, suitable inert diluents such as nitrogen, carbon dioxide, etc., can be introduced with the reactants. In liquid phase processing, a similar preparation and introduction of the reactants can be practiced, although if desired the formate ester can be introduced as a liquid phase in this processing.

The reaction yields the ester of an unsaturated acid or a halo substituted acid. When operating in a continuous fashion, a portion of the liquid reactants can be continuously removed from the liquid phase reaction zone and the esters purified therefrom. A suitable purification step comprises, e.g., simple fractional distillation or azeotropic distillation of the liquid to remove the product esters from the chloroformate reactant if these components form an azeotropic mixture. When the particular reactant and product do not azeotrope, any other known azeotroping agent can be added to obtain the ester in the volatile fraction from the crude product. The products from a vapor phase reaction are, of course, recovered from the vapor effluent. Condensation of this vapor effluent in similar treatment to purify the desired product can be practiced. The products from a liquid phase reaction can also be continuously stripped or vaporized from the reaction medium and removed in a vapor effluent and thereafter treated by condensation and similar fractionation to obtain the desired products. In the manner previously discussed, continuous processing can be practiced to achieve a continuous production of the desired products. If desired, however, batch or discontinuous processing can also be employed. Discontinuous or batch processing can be employed particularly with the liquid phase processing, by charging the reactants to the liquid phase reaction medium without the withdrawal of product therefrom and continuing the reaction until a sufficient accumulation of product has occurred in the reaction zone to warrant discontinuing the reaction and recovering the product therefrom.

EXAMPLE 1

A steel bomb of 300 milliliter capacity is charged with 100 milliliters methyl chloroformate and 200 grams palladium chloride. The bomb is closed and ethylene is introduced to raise the pressure to 800 p.s.i.g. The bomb is then rocked and heated to 150° C. and maintained at that temperature for 4 hours. Upon completion of the reaction period the bomb is cooled, depressured, opened and the liquid products are analyzed by gas chromatography to reveal the production of methyl acrylate and methyl beta-chloropropionate.

EXAMPLE 2

A 250 milliliter flask is partially filled with 50 milliliters 1-octene, 25 milliliters ethyl chloroformate, 2 milliliters 2-choropyridine and 0.5 gram palladium chloride. The flask is heated to and maintained at reflux temperature for four hours, then 50 milliliters of ethanol are added and the mixture is refluxed for four more hours. Upon completion of this period, the flask contents are found to contain ethyl α-methyl octenoate.

EXAMPLE 3

A titanium bomb is charged with 25 milliliters ethyl chloroformate, 10 grams anhydrous potassium carbonate and 0.5 gram palladium chloride. The bomb is pressured to 800 p.s.i.g. with ethylene, then heated to and maintained at 150° C. while rocking for six hours. The bomb is cooled and its contents analyzed and found to contain ethyl acrylate.

EXAMPLE 4

The bomb is charged with 25 milliliters ethyl chloroformate, 10 grams potassium carbonate and 1 gram palladium chloride bistriphenylphosphine, $$PdCl_2[P(C_6H_5)_3]_2$$

The bomb is pressured to 800 p.s.i.g. with ethylene and heated to and maintained at 150° C. for four hours. The bomb is cooled and its contents analyzed and found to contain ethyl acrylate and propionate.

The preceding examples are intended solely to illustrate a mode of practice of the invention and to demonstrate the results obtainable thereby. It is not intended that the invention be construed as unduly limiting in view of the specific illustrations, but instead it is intended that the invention be defined by the steps and reagents and their obvious equivalents set forth in the following claims.

I claim:

1. The manufacture of esters of alpha,beta-ethylenically unsaturated carboxylic acids and beta-chlorocarboxylic acids which comprises contacting a hydrocarbon olefin having from 2 to about 20 carbons and having the following structure:

$$(R)_2C=C(R)_2$$

wherein:
the R groups are the same or different groups selected from the class consisting of hydrogen, alkyl or phenyl and alkylene wherein two of the R groups on different carbons together form said alkylene group; and at least one of the R groups is hydrogen;
with a chloroformate having the following formula:

$$ClC(=O)-OR_1$$

wherein:
$R_1$ is alkyl, cycloalkyl, or aryl having from 1 to about 12 carbons;
at a temperature from about 25° to about 350° C. and a pressure from 1 to about 1000 atmospheres, in the presence of a Group VIII noble metal containing catalyst.

2. The method of claim 1 wherein said Group VIII noble metal is palladium and said olefin has from 2 to 12 carbons.

3. The method of claim 1 wherein said contacting is effected under liquid phase conditions.

4. The method of claim 1 wherein said contacting is effected under vapor phase conditions and said Group VIII noble metal is supported on a solid.

5. The method of claim 1 wherein said contacting is effected in the presence of a hydrohalic acid acceptor selected from the class consisting of alkali metal and alkaline earth metal salts of inorganic oxo polyfunctional acids and said olefin has from 2 to 6 carbons.

6. The method of claim 1 wherein said contacting is effected in the presence of a hydrohalic acid acceptor selected from the class consisting of pyridine and quinoline and the halo and $C_1-C_5$ alkyl derivatives thereof and said olefin has from 2 to 6 carbons.

7. The method of making acrylates and beta-chloropropionates which comprises contacting ethylene with a chloroformate having the following formula:

$$ClC(=O)-OR_1$$

wherein:
$R_1$ is alkyl, cycloalkyl, or aryl having from 1 to about 12 carbons;
said contacting being conducted at a temperature of from about 25° to about 350° C. and at a pressure of from about 1 to about 1000 atmospheres in the presence of a Group VIII noble metal-containing catalyst.

8. The method defined in claim 7 wherein said Group VIII noble metal catalyst is palladium in complex association with a biphyllic ligand having at least 3 carbons and selected from the class consisting of:

$$E(R)_3 \text{ and}$$

$$(R)_2ER'E(R)_2$$

wherein:
E is a trivalent atom selected from the class of phosphorus, arsenic and antimony;
R is a member selected from the class consisting of hydrogen, alkyl having from 1 to 8 carbon atoms, aryl having from 6 to 8 carbons and the halo and alkoxy substitution products thereof; and
R' is an alkylene having from 1 to about 8 carbons.

References Cited

UNITED STATES PATENTS

| | | | |
|---|---|---|---|
| 2,817,678 | 12/1957 | Barnhart | 260—487 |
| 3,457,299 | 7/1969 | Closson et al. | 260—486 |
| 3,501,518 | 3/1970 | Von Kutepow | 260—486 X |

LORRANE A. WEINBERGER, Primary Examiner

P. J. KILLOS, Assistant Examiner

U.S. Cl. X.R.

260—408, 410, 410.5, 410.9 R, 463, 468 R, 479 R, 487, 544 K